(12) United States Patent
Chen

(10) Patent No.: US 7,924,134 B2
(45) Date of Patent: Apr. 12, 2011

(54) INDUCTOR PACKAGING FOR POWER CONVERTERS

(75) Inventor: Keming Chen, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 283 days.

(21) Appl. No.: 11/958,154

(22) Filed: Dec. 17, 2007

(65) Prior Publication Data

US 2009/0153284 A1    Jun. 18, 2009

(51) Int. Cl.
*H01F 27/28* (2006.01)
*H01F 27/02* (2006.01)
*H01F 21/06* (2006.01)
*H01F 27/24* (2006.01)
*H01F 17/04* (2006.01)
*H02J 3/00* (2006.01)
*H02M 5/45* (2006.01)

(52) U.S. Cl. .......... 336/220; 336/83; 336/131; 336/214; 336/221; 336/222; 363/34; 363/37

(58) Field of Classification Search .................. None
See application file for complete search history.

(56) References Cited

U.S. PATENT DOCUMENTS

| | | | | |
|---|---|---|---|---|
| 4,661,897 | A | * | 4/1987 | Pitel ................................ 363/71 |
| 5,184,291 | A | * | 2/1993 | Crowe et al. .................... 363/37 |
| 5,872,489 | A | * | 2/1999 | Chang et al. ................... 331/179 |
| 6,147,886 | A | * | 11/2000 | Wittenbreder ................. 363/95 |
| 6,449,178 | B1 | * | 9/2002 | Sakai et al. .................... 363/131 |
| 6,483,724 | B1 | * | 11/2002 | Blair et al. ..................... 363/17 |
| 6,492,891 | B2 | * | 12/2002 | Yamaguchi ................... 336/198 |
| 6,578,253 | B1 | * | 6/2003 | Herbert .......................... 29/605 |
| 6,798,089 | B1 | * | 9/2004 | Smit ........................ 310/12.26 |
| 6,856,521 | B1 | * | 2/2005 | Chen et al. ..................... 363/17 |
| 7,132,812 | B1 | * | 11/2006 | Wu et al. ........................ 318/448 |
| 7,142,081 | B1 | * | 11/2006 | Shudarek ...................... 336/178 |
| 7,230,355 | B2 | * | 6/2007 | Lin et al. ..................... 310/12.01 |
| 7,289,329 | B2 | * | 10/2007 | Chen et al. .................... 361/707 |
| 7,612,640 | B2 | * | 11/2009 | Sano ............................... 336/83 |
| 2006/0187684 | A1 | * | 8/2006 | Chandrasekaran et al. .... 363/16 |
| 2008/0007385 | A1 | * | 1/2008 | Miller et al. ............... 336/84 M |

* cited by examiner

*Primary Examiner* — Anh T Mai
*Assistant Examiner* — Mangtin Lian
(74) *Attorney, Agent, or Firm* — Ingrassia Fisher & Lorenz, P.C.

(57) ABSTRACT

A vehicular power converter includes switches and first and second inductive components. The first and second inductive components have substantially adjacent portions and are coupled to the plurality of switches such that when current flows from the plurality of switches and through the first and second inductive components, flux generated by the current flowing through the adjacent portions of the first and second inductive components and located between the adjacent portions is oriented in substantially opposite directions.

17 Claims, 4 Drawing Sheets

US 7,924,134 B2

INDUCTOR PACKAGING FOR POWER CONVERTERS

TECHNICAL FIELD

The present invention generally relates to electrical components, and more particularly relates to the packaging of electrical components in power converters.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel vehicles, such as hybrid, electric, and fuel cell vehicles. Such alternative fuel vehicles typically use one or more electric motors, perhaps in combination with another actuator, to drive the wheels. Additionally, such automobiles may also include other motors, as well as other high voltage components, to operate the other various systems within the automobile, such as the air conditioner.

Such vehicles, particularly fuel cell vehicles, often use two separate voltage sources, such as a battery and a fuel cell, to power the electric motors that drive the wheels. Power converters, such as direct current-to-direct current (DC/DC) converters, are typically used to manage and transfer the power from the two voltage sources. Due to the fact that alternative fuel automobiles typically include only direct current (DC) power supplies, direct current-to-alternating current (DC/AC) inverters (or power inverters) are also provided to convert the DC power to alternating current (AC) power, which is generally required by the motors.

As the power demands on the electrical systems in alternative fuel vehicles continue to increase, there is an ever increasing need to maximize the electrical efficiency of such systems. Additionally, there is a constant desire to reduce the size of the components within the electrical systems in order to minimize the overall cost and weight of the vehicles.

Accordingly, it is desirable to provide an inductor assembly with improved electrical performance and reduced size and manufacturing costs. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A vehicular power converter is provided. The vehicular power converter includes a plurality of switches and first and second inductive components. The first and second inductive components have substantially adjacent portions and are coupled to the plurality of switches such that when current flows from the plurality of switches and through the first and second inductive components, flux generated by the current flowing through the adjacent portions of the first and second inductive components and located between the adjacent portions is oriented in substantially opposite directions.

An automotive power converter is provided. The automotive power converter includes a plurality of pairs of switches, a first inductor including a first conductive winding coupled to the plurality of pairs of switches, and a second inductor including a second conductive winding coupled to the plurality of pair of switches and the first conductive winding. The first conductive winding has first and second portions, and the second conductive winding has first and second portions. The first and second inductors are configured such that the first portions of the first and second conductive windings are between the second portions of the first and second conductive windings and when current flows through the plurality of pairs of switches and the first and second inductors, flux generated by the current flowing through the first portion of the first conductive winding and located between the first portions of the first and second conductive windings is oriented in a first direction and flux generated by the current flowing through the first portion of the second conductive winding and located between the first portions of the first and second conductive windings is oriented in a second direction. The second direction is substantially opposite the first direction.

An automotive drive system is provided. The automotive drive system includes an electric motor, a power converter coupled to the electric motor and configured to be coupled to a first voltage source and a second voltage source, and a microprocessor in operable communication with the power converter. The power converter includes a plurality of switches and first and second inductive components. The microprocessor is configured to activate the plurality of switches to cause current to flow through the first and second inductive components. The first and second inductive components are configured such that the first portion of the first inductive component is between the second portion of the first inductive component and the second inductive component and when current flows from the plurality of switches and through the first and second inductive components, flux generated by the current flowing through the first portion of the first inductive component and located between the first portion of the first inductive component and the second inductive component is oriented in a first direction and flux generated by the current flowing through the second inductive component and located between the first portion of the first inductive component and the second inductive component is oriented in a second direction. The second direction is substantially opposite the first direction.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-8 are merely illustrative and may not be drawn to scale.

FIG. 1 to FIG. 8 illustrate a vehicle and a vehicular power converter. In one embodiment, the vehicular power converter includes a plurality of switches, a first inductive component having first and second portions and being coupled to the plurality of switches, and a second inductive component coupled to the plurality of switches and the first inductive component. The first and second inductive components are configured such that the first portion of the first inductive component is between the second portion of the first inductive component and the second inductive component and when current flows from the plurality of switches and through the first and second inductive components, flux generated by the current flowing through the first portion of the first inductive component and located between the first portion of the first inductive component and the second inductive component is oriented in a first direction and flux generated by the current flowing through the second inductive component and located between the first portion of the first inductive component and the second inductive component is oriented in a second direction. The second direction is substantially opposite the first direction.

Figure 1:
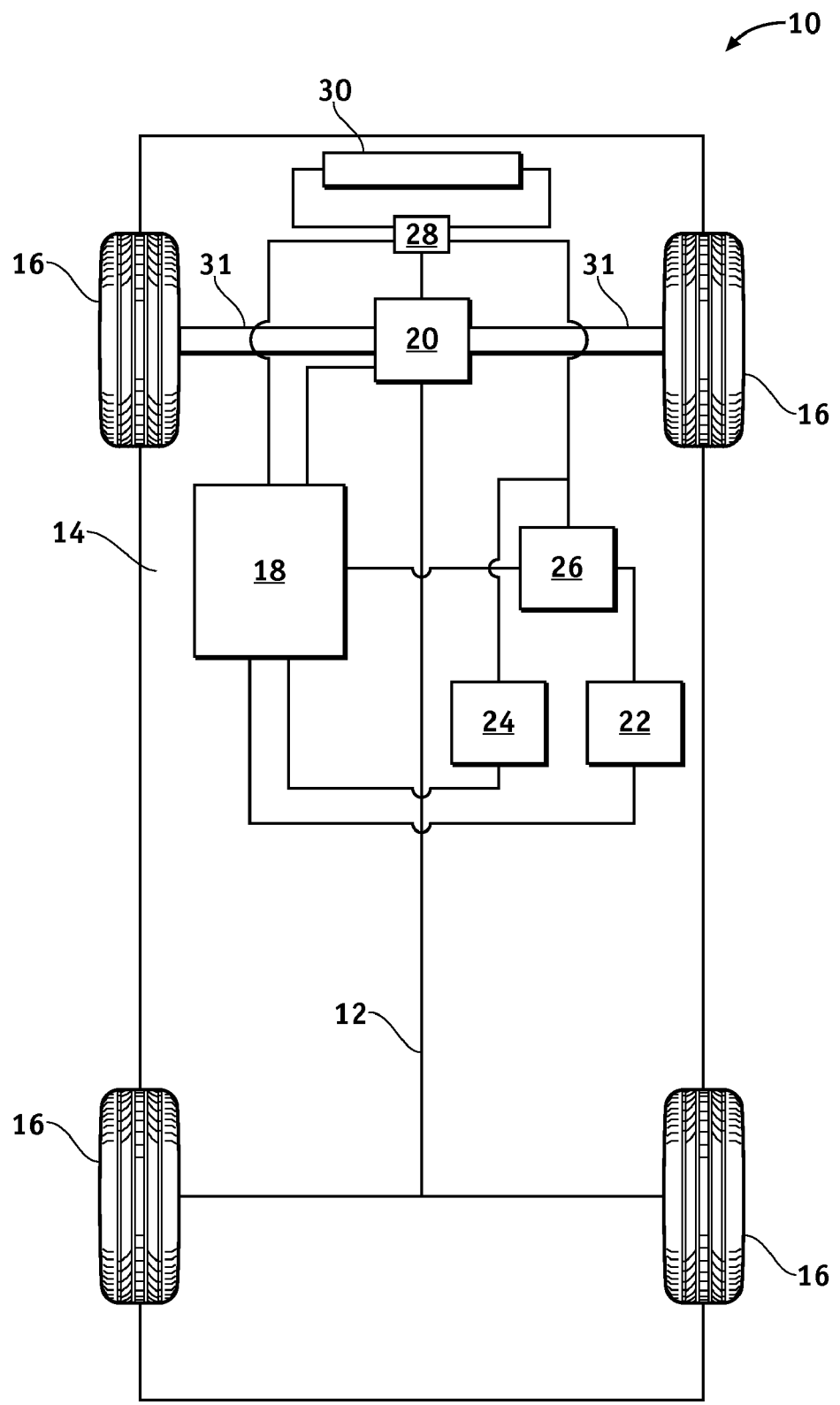
FIG. 1 is a schematic view of an exemplary automobile, according to one embodiment of the present invention.

FIG. 1 illustrates a vehicle, or automobile 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 10 is a fuel cell vehicle, and further includes an electric motor/generator 20, a battery 22, a fuel cell power module (FCPM) 24, a direct current-to-direct current (DC/DC) converter system (or a first power converter) 26, a direct current-to-alternating current (DC/AC) inverter (or a second power converter) 28, and a radiator 30. Although not illustrated, the electric motor/generator 20 (or motor) includes a stator assembly (including conductive coils), a rotor assembly (including a ferromagnetic core), and a cooling fluid (i.e., coolant), as will be appreciated by one skilled in the art. The motor 20 may also include a transmission integrated therein such that the motor 20 and the transmission are mechanically coupled to at least some of the wheels 16 through one or more drive shafts 31.

As shown, the battery 22 and the FCPM 24 are in operable communication and/or electrically connected to the electronic control system 18 and the DC/DC converter system 26. Although not illustrated, the FCPM 24, in one embodiment, includes, amongst other components, a fuel cell having an anode, a cathode, an electrolyte, and a catalyst. As is commonly understood, the anode, or negative electrode, conducts electrons that are freed from, for example, hydrogen molecules so that they can be used in an external circuit. The cathode, or positive electrode (i.e., the positive post of the fuel cell), conducts the electrons back from the external circuit to the catalyst, where they can recombine with the hydrogen ions and oxygen to form water. The electrolyte, or proton exchange membrane, conducts only positively charged ions while blocking electrons. The catalyst facilitates the reaction of oxygen and hydrogen.

Figure 2:
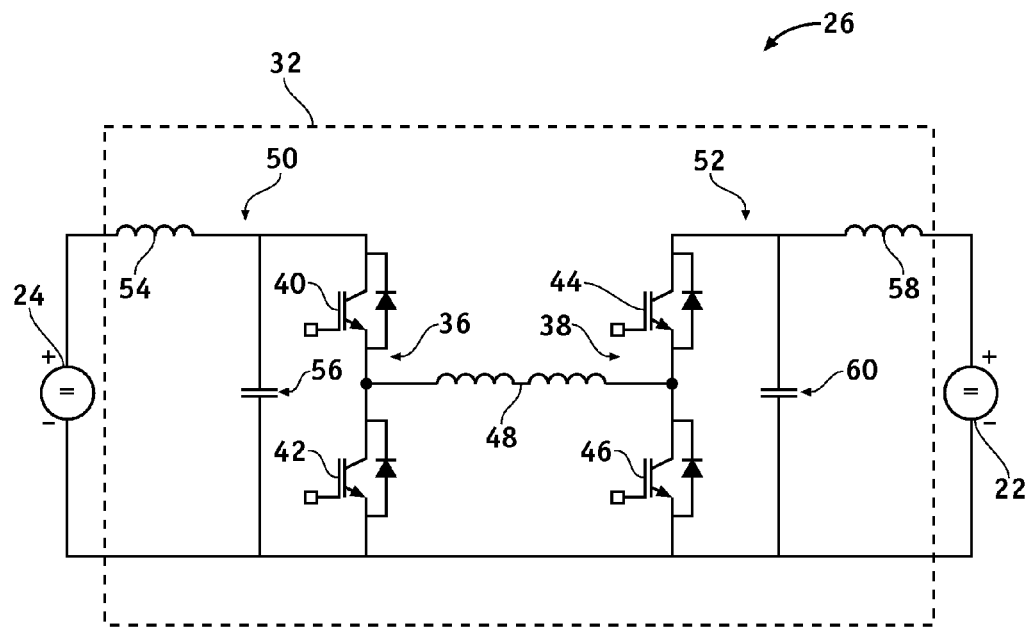
FIG. 2 is a schematic view of a direct current-to-direct current (DC/DC) power converter within the automobile of FIG. 1.

FIG. 2 schematically illustrates the DC/DC converter system 26 in greater detail. In the depicted embodiment, the DC/DC converter system 26 includes a bi-directional DC/DC converter (BDC) 32 coupled to the FCPM 24 and the battery 22. The BDC converter 32, in the depicted embodiment, includes a power switching section with two dual insulated gate bipolar transistor (IGBT) legs 36 and 38, each having two IGBTs, 40 and 42, and 44 and 46, respectively. The two legs 36 and 38 are interconnected at midpoints by a switching inductor (or switching inductors, as described below) 48 having an inductance. The BDC converter 32 also includes a first filter 50 connected to the positive rail of the first IGBT leg 36 and a second filter 52 connected to the positive rail of the second IGBT leg 38. As shown, the filters 50 and 52 include a first inductor 54, a first capacitor 56, a second inductor 58, and a second capacitor 60, respectively. The first IGBT leg 36 is connected to the FCPM 24 through the first filter 50, and the second IGBT leg 38 is connected to the battery 22 through the second filter 52. As shown, the FCPM 24 and the battery are not galvanically isolated, as the negative (−) terminals are electrically connected.

Although not shown, the DC/DC converter system 26 may also include a BDC controller in operable communication with the BDC converter 32. The BDC controller may be implemented within the electronic control system 18 (FIG. 1), as is commonly understood in the art.

Figure 3:
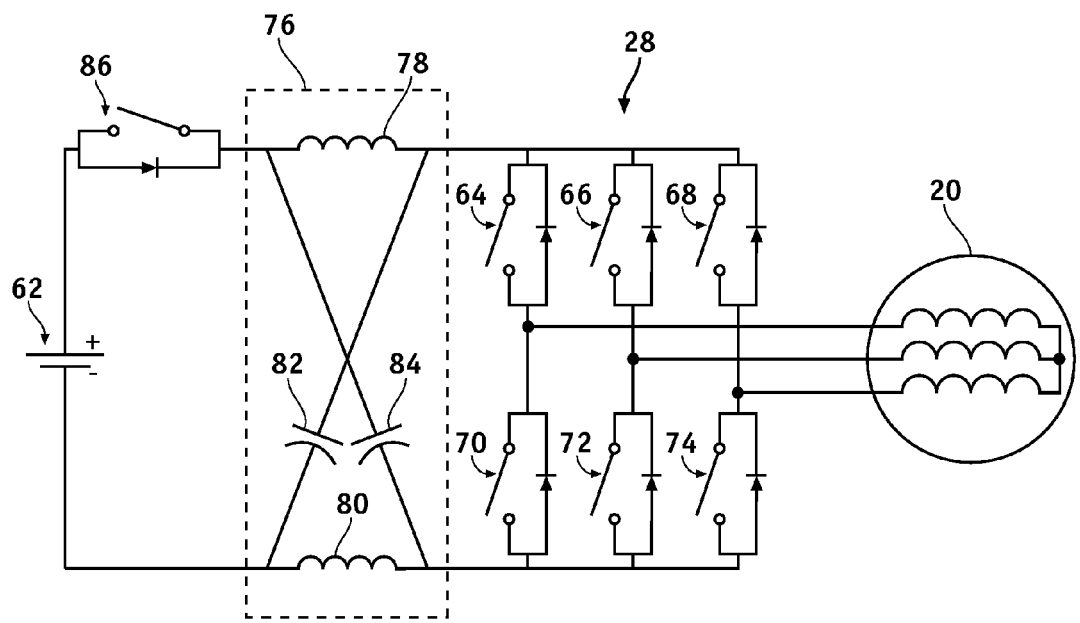
FIG. 3 is a schematic view of a direct current-to-alternating current (DC/AC) power inverter within the automobile of FIG. 1.

FIG. 3 schematically illustrates the DC/AC inverter 28 in greater detail. The inverter 28 includes a three-phase circuit coupled to the motor 20. More specifically, the inverter 28 includes a switch network having a first input coupled to a voltage source 62 (e.g., the battery 22 and/or the FCPM 24 through the DC/DC converter system 26 and an output coupled to the motor 20). Although a single voltage source is shown, a distributed direct current (DC) link with two series voltage sources may be used.

The switch network comprises three pairs of series switches with antiparallel diodes (i.e., antiparallel to each switch) corresponding to each of the phases. Each of the pairs of series switches comprises a first switch, or transistor, (i.e., a "high" switch) 64, 66, and 68 having a first terminal coupled to a positive electrode of the voltage source 62 and a second switch (i.e., a "low" switch) 70, 72, and 74 having a second terminal coupled to a negative electrode of the voltage source 62 and having a first terminal coupled to a second terminal of the respective first switch 64, 66, and 68.

In one embodiment, the inverter 28 is a "z-source" inverter, as is commonly understood, and includes an impedance source 76 coupled between the voltage source 62 and the pairs of switches, which includes an inductive component (or at least one inductor) and a capacitive component (or at least one capacitor). In the depicted embodiment, the inductive component includes a split inductor having a first inductive portion 78 and a second inductive portion 80, each of which has first and second sides. The first inductive portion 78 is connected between the first switches 64, 66, and 68 and the positive electrode of the voltage source 62. The second inductive portion 80 is connected between the second switches 70, 72, and 74 and the negative terminal of the voltage source 62.

The capacitive component includes a first capacitor 82 and a second capacitor 84 connected in an "X" configuration to the first and second inductive portions 76 and 78. That is, the first capacitor 82 has a first terminal connected to the first side of the first inductive portion 78 and a second terminal connected to the second side of the second inductive portion 80. The second capacitor 84 has a first terminal connected to the second side of the first inductive portion 78 and a second terminal connected to the first side of the second inductive portion 80. In the depicted embodiment, the inverter 28 also includes an additional switch 86, which may be similar to the switches 64-74 and used to allow a higher voltage to be maintained on the inverter side of the DC bus.

Although not shown, the DC/AC inverter 28 may also include an inverter control module, which may be implemented within the electronic control system 18 (FIG. 1), as is commonly understood in the art.

The BDC 32 and the inverter 28 may also include a plurality of power module devices, each including a semiconductor substrate with an integrated circuit formed thereon, amongst which the switches 40-46 and 64-74 are distributed, as is commonly understood.

Referring again to FIG. 1, the radiator 30 is connected to the frame at an outer portion thereof and although not illustrated in detail, includes multiple cooling channels therethough that contain a cooling fluid (i.e., coolant) such as water and/or ethylene glycol (i.e., "antifreeze) and is coupled to the motor 20 and the inverter 28. In one embodiment, the inverter 28 receives and shares coolant with the electric motor 20. The radiator 30 may be similarly connected to the inverter 28 and/or the electric motor 20.

The electronic control system 18 is in operable communication with the motor 20, the battery 22, the FCPM 24, the DC/DC converter system 26, and the inverter 28. Although not shown in detail, the electronic control system 18 includes various sensors and automotive control modules, or electronic control units (ECUs), such as the BDC controller, the inverter control module, and a vehicle controller, and at least one processor and/or a memory which includes instructions stored thereon (or in another computer-readable medium) for carrying out the processes and methods as described below.

Figure 4:
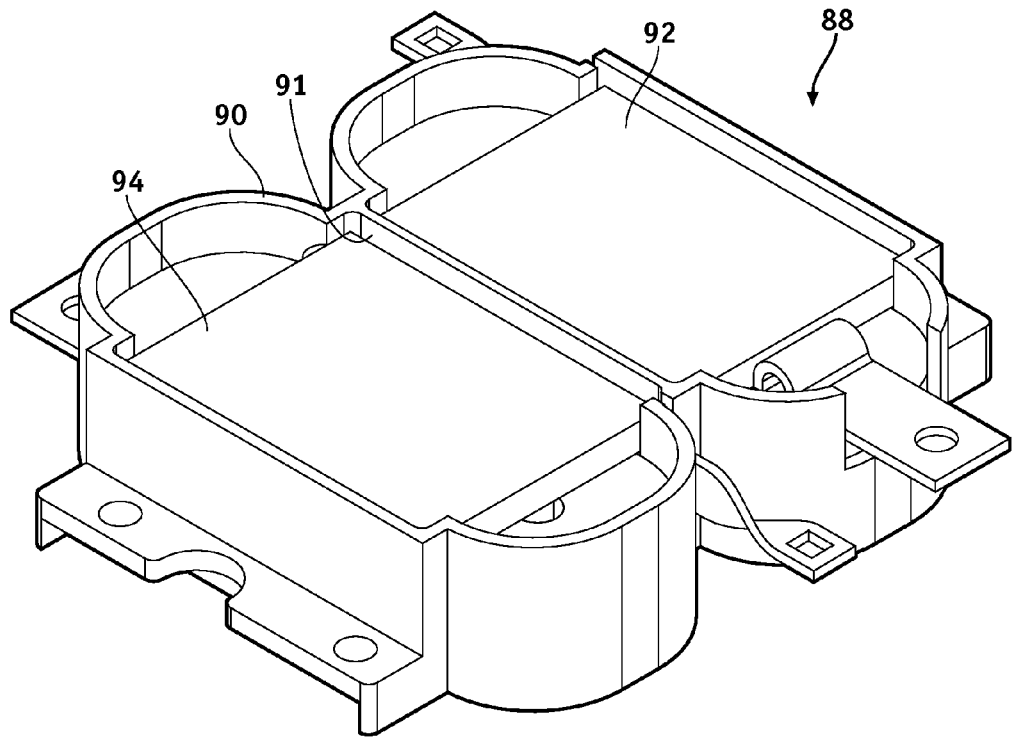
FIG. 4 is an isometric view of an inductor assembly, according to one embodiment of the present invention.

FIG. 4 illustrates an inductor assembly 88, according to one embodiment of the present invention. The inductor assembly 88 may be utilized as, for example, the switching inductor 48 within the BDC 32 and/or the first and second inductive portions 78 and 80 within the DC/AC inverter 28.

As shown in FIG. 4, the inductor assembly 88 includes a housing 90 and first and second inductors 92 and 94. The housing 90 is shaped to form two inductor pockets into which the inductors 92 and 94 are positioned. As will be described in greater detail below, the first and second inductors 92 and 94 are arranged in a "flipped" configuration in which the second inductor 94 sits within the housing 90 in an orientation opposite that of the first inductor 92. The first and second inductors 92 and 94 are held within the housing 90 such that adjacent sides thereof are in close proximity. In one embodiment, the first and second inductors 92 and 94 are each in contact with and separated by a dividing wall 91 of the housing 90 that separates the inductor pockets.

Figure 5:
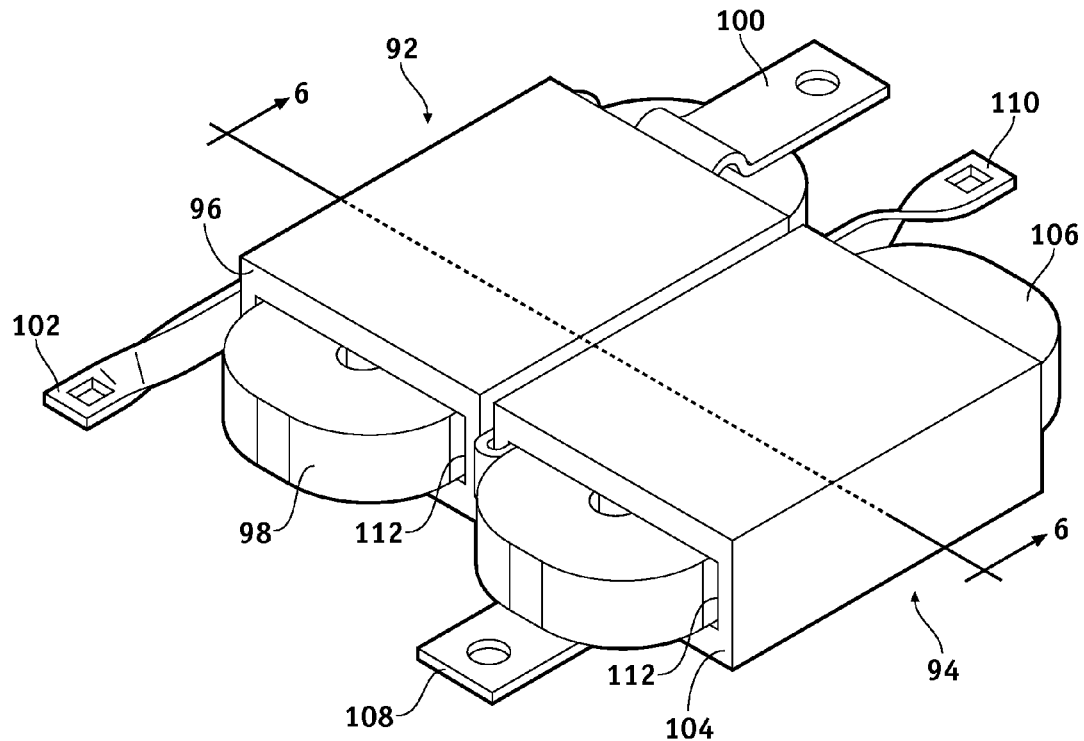
FIG. 5 is an isometric view of two inductors within the inductor assembly of FIG. 4.
Figure 6:
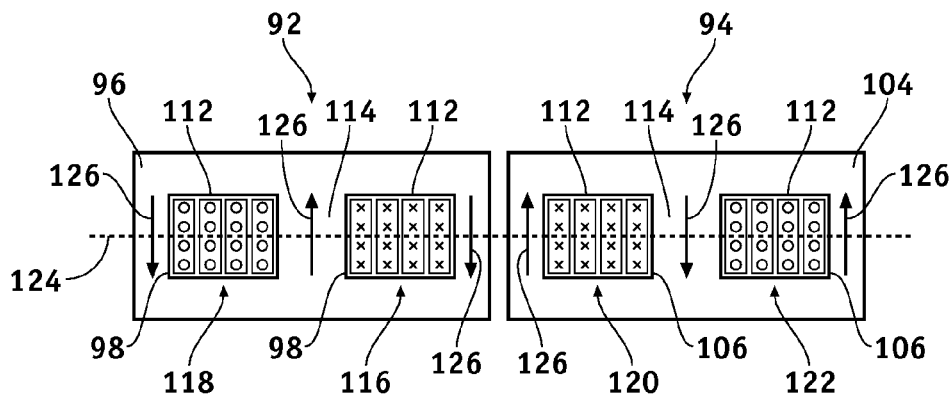
FIGS. 6 and 7 are cross-sectional views of the inductors of FIG. 5 taken along line 6-6.

FIGS. 5 and 6 illustrate the first and second inductors 92 and 94 in greater detail. The first inductor 92 includes a first core 96, a first conductive winding 98, and first and second leads 100 and 102. The second inductor 94 includes a second core 104, a second conductive winding 106, and first and second leads 108 and 110. The first and second cores 96 and 104 are substantially rectangular in shape and have winding openings 112 extending therethrough on opposing sides of a central portion 114. The winding openings 112 and the central portions 114 extend the entire length of the cores 96 and 104. The cores 96 and 104 are made of a ferromagnetic material, such as laminated silicon steel, ferrite, or other suitable material.

The first and second conductive windings 98 and 106 are positioned within the winding openings 112 and "wrapped" around the central portions 114 of the cores 96 and 104, respectively. As such, referring specifically to FIG. 6, the first conductive winding 98 has an inner (or first) portion 116 on an inner side of the central portion 114 of the first core 96 and an outer (or second) portion 118 on an outer side of the central portion 114 of the first core 96. Likewise, the second conductive winding 106 has an inner (or first) portion 120 on an inner side of the central portion 114 (and substantially adjacent to the inner portion 116 of the first conductive winding 98) of the second core 104 and an outer (or second) portion 122 on an outer side of the central portion 114 of the second core 104. In the depicted embodiment, the first and second conductive windings 98 and 106 are of the "ribbon" type. The first and second conductive windings are made of an electrically conductive material, such as copper. As shown, the first and second inductors 92 and 94 are aligned along a line 124 that extends through the inner portions 116 and 120, as well as the outer portions 118 and 122, of the respective first and second conductive windings 98 and 106.

As shown in FIG. 5, on the first inductor 92, the first lead 100 extends from a far end at an upper side thereof, while the second lead 102 extends from a near end of the first inductor 92 along a side edge thereof. On the second inductor 94, the first lead 108 extends from a near end at a lower side thereof, while the second lead 110 extends from a far end along a side edge thereof. Although not specifically shown, the first and second leads 100 and 102 of the first inductor 92 are electrically connected to opposing ends of the first conductive winding 98, and the first and second leads 108 and 110 of the second inductor 94 are electrically connected to opposing ends of the second conductive winding 106. As indicated by the arrangement of the switching inductor 48 shown in FIG. 2, in one embodiment, the first and second inductors 92 and 94 (and/or the first and second conductive windings 98 and 106) are connected in series.

As should be apparent from FIGS. 4 and 5, in the depicted embodiment, the first and second inductors 92 and 94 are substantially identical. However, the second inductor 94 is rotated approximately 180°, or flipped, about the line 124 shown in FIG. 6. As such, the first and second inductors 92 and 94 are in a flipped configuration, as mentioned above.

During operation, referring again to FIG. 1, the automobile 10 is operated by providing power to the wheels 16 with the electric motor 20 which receives power from the battery 22 and the FCPM 24 in an alternating manner and/or with the battery 22 and the FCPM 24 simultaneously. In order to power the motor 20, direct current (DC) power is provided from the battery 22 and the FCPM 24 to the inverter 28, via the DC/DC converter system 26, which converts the DC power into alternating current (AC) power, before the power is sent to the electric motor 20.

The electronic control system 18 (or the BDC controller and/or the inverter control module) control the DC/DC converter system 26 and the DC/AC inverter 28. The DC/DC converter system 26 transfers power between the FCPM 24 and the battery 22. In one embodiment, the switching inductor 48 is primarily responsible for the power conversion process, as the switching inductor 48 stores energy in a first part of the operating cycle and releases it in a second part of the operating cycle. Thus, the switching inductor 48 ensures that the energy transfer takes place in the desired direction, regardless of the voltaic relationship between the FCPM 24 and the battery 22, and a constant average current, equal to the desired average current, is impressed through the switching inductor 48.

Referring again to FIGS. 1, 2, and 3, generally, the inverter control module produces a Pulse Width Modulation (PWM) signal for controlling the switching action of the inverter 28. As will be appreciated by one skilled in the art, within the DC/AC inverter 28, the conversion of DC power to AC power is substantially performed by operating (i.e., repeatedly switching) the switches 64-74 at a "switching frequency," such as, for example, 12 kilohertz (kHz).

During various periods of operation, current flows through the switching inductor 48 within the BDC 32, as well as the first and second inductive portions 78 and 80 within the DC/AC inverter 28. When utilized as the switching inductor 48 within the BDC 32 and/or the inductive portions 78 and 80 within the DC/AC inverter 28, current flows through the first and second inductors 92 and 94 as shown in FIG. 6.

Still referring to FIG. 6, current flows through both the inner portions 116 and 120 of the respective first and second conductive windings 98 and 106 in one direction (e.g., into the page). Current also flows through the outer portions 118 and 122 of the respective first and second conductive windings 98 and 106 in one direction (e.g., out of the page).

As a result, flux (indicated with flux arrows 126) located between the inner portions 116 and 120 of the windings 98 and 106 and generated by the current flowing through the respective inner portions 116 and 120 of the windings 98 and 106 is oriented in opposing, or substantially opposite, directions. Specifically, in the embodiment shown in FIG. 6, flux generated by the current flowing through the inner portion 116 of the first conductive winding 98, and located between the inner portions 116 and 120, is oriented downwards (or in a first direction). Flux generated by the current flowing through the inner portion 120 of the second conductive winding 106, and located between the inner portions 116 and 120, is oriented upwards (or in a second direction).

Because current flows through the inner portions 116 and 120 and the outer portions 118 and 122 in opposite directions, substantially all flux generated within the central portions 114 of the cores 96 and 104 is oriented in the same direction. That is, flux generated by the current flowing through both the inner portion 116 and the outer portion 118 of the first conductive winding 98 within the central portion 114 of the first core 96 is oriented upwards (i.e., in the second direction). Flux generated by the current flowing through both the inner portion 120 and the outer portion 122 of the second conductive winding 106 within the central portion 114 of the second core 104 is oriented downwards (i.e., in the first direction).

Figure 7:
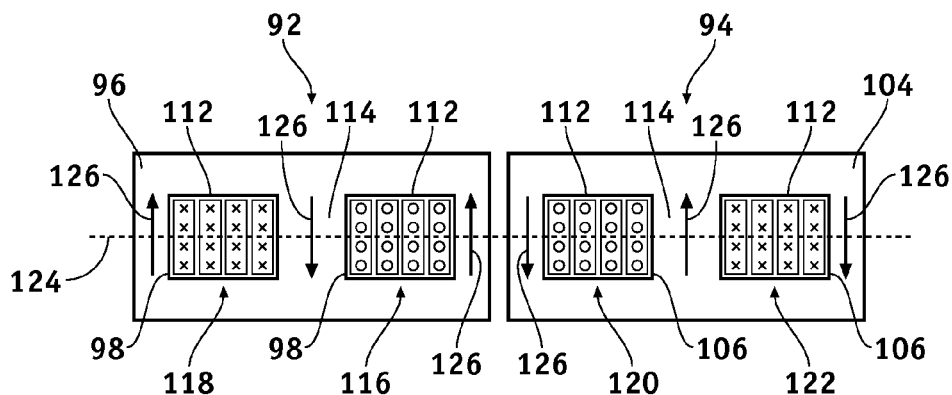

As shown in FIG. 7, when the current flows through the first and second inductors 92 and 94 in a direction opposite that shown in FIG. 6, the flux generated reverses its orientation, such that each of the flux arrows 126 points in the opposite direction. As a result, the flux generated by the current flowing each of the inner portions 116, and positioned therebetween, continues to be oriented in opposite directions.

One advantage of the inductor assembly described above is that because current flows through the inner portions of both of the conductive windings in the same direction, the flux generated from each is oriented in opposite directions. As a result, the flux between the first and second inductors is at least partially cancelled, thereby reducing core and copper losses. Thus, smaller components may be used for the inductors, which reduces the size and the costs of the inductor assembly, the power converter, and the vehicle as a whole.

Figure 8:
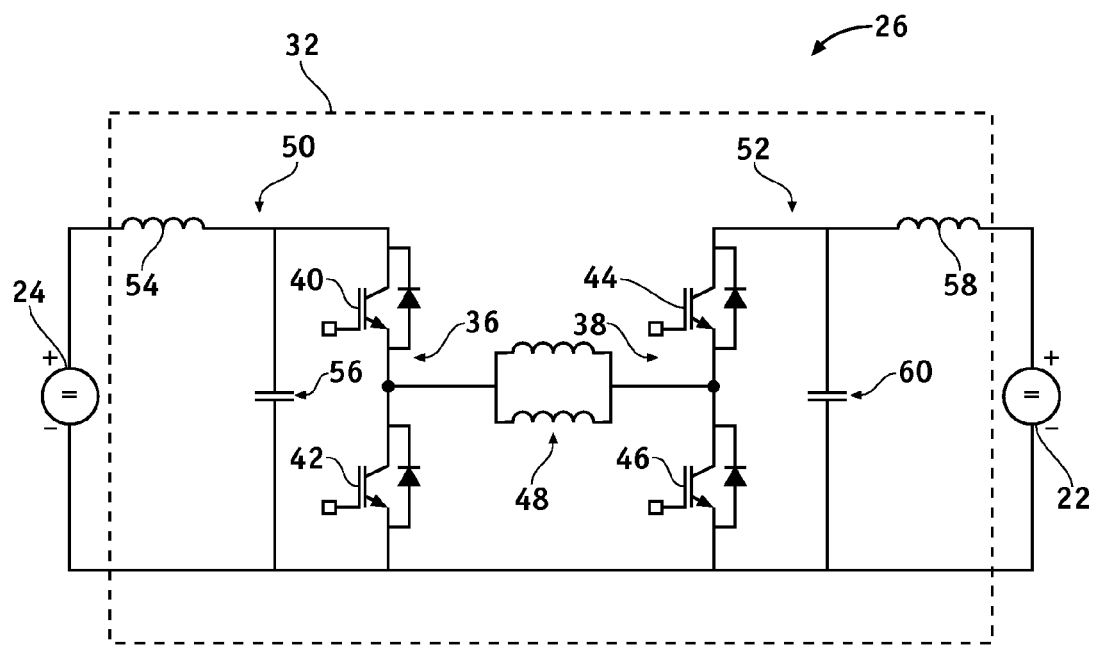
FIG. 8 is a schematic view of a direct current-to-direct current (DC/DC) power converter according to another embodiment of the present invention.

Other embodiments may be utilized in different types of vehicles, such as aircraft and watercraft, or in different electrical systems altogether, as it may be implemented in any situation in which multiple inductors, or a split inductor, may be used. Additionally, the inductor assembly may be used with inductors connected in different electrical configurations. FIG. 8 illustrates the DC/DC converter system 26 according to another embodiment of the present invention. As indicated by the configuration of the switching inductor 48 shown, the first and second inductors 92 and 94 are connected in parallel (or are split) between the midpoints of the IGBT legs 36 and 38. During operation of the converter system 26 shown in FIG. 8, current flows through the switching inductor 48 as shown in FIGS. 6 and 7 and described above.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular power converter comprising:
   a plurality of switches; and
   first and second inductive components having substantially adjacent portions and being arranged and coupled to the plurality of switches such that when current flows from the plurality of switches and through the first and second inductive components, wherein the first inductive component comprises a first conductive winding and the second inductive component comprises a second conductive winding, and wherein
   substantially all flux generated by the current flowing through the adjacent portion of the first inductive component and located between the first and second inductive components is oriented in substantially a first direction, and
   substantially all flux generated by the current flowing through the adjacent portion of the second inductive component and located between the first and second inductive components is oriented in substantially a second direction, the second direction being substantially opposite the first direction,
   wherein the first conductive winding is wrapped about a first axis and the second conductive winding is wrapped around a second axis, the first and second axes being substantially parallel to the first and second directions, and wherein
   substantially all flux generated by the current along the first axis within the first conductive winding is oriented in substantially the second direction, and substantially all flux generated by the current along the second axis within the second conductive winding is oriented in substantially the first direction.

2. The vehicular power converter of claim 1, wherein the first and second inductive components are arranged and coupled to the plurality of switches such that when the current flows from the plurality of switches and through the first and second inductive components, substantially all of the current flowing through the adjacent portions of the first and second inductive components flows substantially in a third direction.

3. The vehicular power converter of claim 2, wherein the first inductive component comprises first and second portions, and the first and second inductive components are configured such that the first portion of the first inductive component is between the second portion of the first inductive component and the second inductive component, and wherein the second inductive component comprises first and second portions, and the first portion of the second inductive component is between the second portion of the first inductive component and the second portion of the second inductive component.

4. The vehicular power converter of claim 3, wherein the first and second inductive components are further configured such that flux generated by the current flowing through the first portion of the first inductive component and located between the first and second portions of the first inductive component is oriented in the second direction and flux generated by the current flowing through the second portion of the first inductive component and located between the first and second portions of the first inductive component is oriented in the second direction.

5. The vehicular power converter of claim 4, wherein the first and second inductive components are further configured such that flux generated by the current flowing through the first portion of the second inductive component and located between the first and second portions of the second inductive component is oriented in the first direction and flux generated by the current flowing through the second portion of the second inductive component and located between the first and second portions of the second inductive component is oriented in the first direction.

6. The vehicular power converter of claim 5, wherein a line extending through the first portions of the first and second inductive components also extends through the second portions of the first and second inductive components.

7. The vehicular power converter of claim 2, wherein the first and second inductive components are electrically coupled in series.

8. The vehicular power converter of claim 1, wherein the vehicular power converter is a direct current-to-alternating current (DC/AC) power inverter or a direct current-to-direct current (DC/DC) power converter.

9. An automotive power converter comprising:
a plurality of pairs of switches;
a first inductor comprising a first conductive winding coupled to the plurality of pairs of switches, the first conductive winding having first and second portions; and
a second inductor comprising a second conductive winding coupled to the plurality of pair of switches and the first conductive winding, the second conductive winding having first and second portions, the first and second inductors being configured such that the first portions of the first and second conductive windings are between the second portions of the first and second conductive windings and when current flows through the plurality of pairs of switches and the first and second inductors, substantially all flux generated by the current flowing through the first portion of the first conductive winding and located between the first and second conductive windings is oriented in a first direction, substantially all flux generated by the current flowing through the first portion of the second conductive winding and located between the first and second conductive windings is oriented in a second direction, the second direction being substantially opposite the first direction, and substantially all of the current flowing through the first portions of the first and second conductive windings flows in a third direction, the third direction being substantially orthogonal to the first and second directions, wherein the first and second conductive windings are wrapped about axes that are substantially parallel to the first and second directions, wherein the first conductive winding is wrapped about a first axis and the second conductive winding is wrapped around a second axis, the first and second axes being substantially parallel to the first and second directions, and wherein substantially all flux generated by the current along the first axis within the first conductive winding is oriented in substantially the second direction, and substantially all flux generated by the current along the second axis within the second conductive winding is oriented in substantially the first direction.

10. The automotive power converter of claim 9, wherein the first and second inductors are further configured such that flux generated by the current flowing through the first and second portions of the first conductive winding and located between the first and second portions of the first conductive winding is oriented in the second direction and flux generated by the current flowing through the first and second portions of the second conductive winding and located between the first and second portions of the second conductive winding is oriented in the first direction.

11. The automotive power converter of claim 10, wherein a line extending through the first portions of the first and second conductive windings also extends through the second portions of the conductive windings.

12. The automotive power converter of claim 11, wherein the first and second conductive windings are coupled in series.

13. The automotive power converter of claim 12, wherein the first and second inductors are substantially identical.

14. An automotive drive system comprising:
an electric motor;
a power converter coupled to the electric motor and configured to be coupled to a first voltage source and a second voltage source, the power converter comprising a plurality of switches and first and second inductive components; and
a controller in operable communication with the power converter, the controller being configured to activate the plurality of switches to cause current to flow through the first and second inductive components,
wherein the first and second inductive components are configured such that the first portion of the first inductive component is between the second portion of the first inductive component and the second inductive component and when current flows from the plurality of switches and through the first and second inductive components, wherein the first inductive component comprises a first conductive winding and the second inductive component comprises a second conductive winding, and wherein substantially all flux generated by the current flowing through the first portion of the first inductive component and located between the first inductive component and the second inductive component is oriented in a first direction, and substantially all flux generated by the current flowing through the second inductive component and located between the first inductive component and the second inductive component is oriented in a second direction, the second direction being substantially opposite the first direction, wherein the first conductive winding is wrapped about a first axis and the second conductive winding is wrapped around a second axis, the first and second axes being substantially parallel to the first and second directions, and wherein substantially all flux generated by the current along the first axis within the first conductive winding is oriented in substantially the second direction, and substantially all flux generated by the current along the second axis within the second conductive winding is oriented in substantially the first direction.

15. The automotive drive system of claim 14, wherein the second inductive component comprises first and second portions, the first portion of the second inductive component is between the second portion of the first inductive component and the second portion of the second inductive component, and wherein substantially all of the current flowing through the first portions of the first and second inductive component flows in a third direction, the third direction being substantially orthogonal to the first and second directions.

16. The automotive drive system of claim 15, wherein the first and second inductive components are further configured such that flux generated by the current flowing through the first portion of the first inductive component and located between the first and second portions of the first inductive component is oriented in the second direction and flux generated by the current flowing through the second portion of the first inductive component and located between the first and second portions of the first inductive component is oriented in the second direction and the first and second inductive components are further configured such that flux generated by the current flowing through the first portion of the second inductive component and located between the first and second portions of the second inductive component is oriented in the first direction and flux generated by the current flowing through the second portion of the second inductive component and located between the first and second portions of the second inductive component is oriented in the first direction.

17. The automotive drive system of claim 14, wherein the first and second inductive components are electrically coupled in series and the first and second inductive components are substantially identical.

\* \* \* \* \*